United States Patent [19]

Kayane et al.

[11] Patent Number: 5,308,362
[45] Date of Patent: May 3, 1994

[54] FIBER REACTIVE YELLOW DYE COMPOSITION

[75] Inventors: Yutaka Kayane, Ikoma; Naoki Harada, Ibaraki; Kingo Akahori, Toyonaka, all of Japan

[73] Assignee: Sumitomo Chemical Company, Limited, Osaka, Japan

[21] Appl. No.: 794,217

[22] Filed: Nov. 19, 1991

[30] Foreign Application Priority Data

Nov. 27, 1990 [JP] Japan ................................ 2-326672
Feb. 15, 1991 [JP] Japan ................................ 3-022104
Apr. 12, 1991 [JP] Japan ................................ 3-079707
Jul. 1, 1991 [JP] Japan ................................ 3-160470

[51] Int. Cl.⁵ ............................................. C09B 49/00
[52] U.S. Cl. ...................................... 8/641; 8/549; 8/639; 8/437
[58] Field of Search .................... 8/549, 641, 437, 639

[56] References Cited

U.S. PATENT DOCUMENTS

| | | | |
|---|---|---|---|
| 4,378,313 | 3/1983 | Kayane et al. ............ | 534/638 |
| 4,511,507 | 4/1985 | Kayane et al. ............ | 8/549 |
| 4,515,598 | 5/1985 | Meininger et al. ......... | 8/549 |
| 4,540,418 | 9/1985 | Otake et al. .............. | 8/524 |
| 4,548,612 | 10/1985 | Kayane et al. ........... | 8/524 |
| 4,557,731 | 12/1985 | Sasakura et al. ........ | 8/531 |

FOREIGN PATENT DOCUMENTS

| | | | |
|---|---|---|---|
| 0127456 | 12/1984 | European Pat. Off. ..... | 8/524 |
| 0234573 | 9/1987 | European Pat. Off. ..... | 8/549 |
| 63-213573 | 9/1988 | Japan . | |

OTHER PUBLICATIONS

H. Zollinger, "Color Chemistry", (VCH), 1987, pp. 136 and 139.
Chemical Abstracts, vol. 110 (10), abstract No. 77505, "Monoazo reactive dye compositions for cellulosic fibers", Kashiwane et al. (1989), & JP 63,213,573 (88,213,573).
Chemical Abstracts, vol. 107, No. 6, Aug. 1, 1987, Columbus, Ohio, US, abstract No. 41641f, p. 93 & JP-A-61 296 186 (Sumitomo), Dec. 26, 1986.
Chemical Abstracts, vol. 110, No. 8, Apr. 17, 1989, Columbus, Ohio, US, abstract No. 136910u, p. 83 & JP-A-63 210 170 (Sumitomo), Aug. 31, 1988.
Patent Abstracts of Japan, vol. 12, No. 501 (C-556) (3348) Dec. 27, 1988 & JP-A-63 213 573 (Sumitomo), Sep. 6, 1988.

*Primary Examiner*—Paul Lieberman
*Assistant Examiner*—Nicholas Ogden
*Attorney, Agent, or Firm*—Stevens, Davis, Miller & Mosher

[57] ABSTRACT

A fiber reactive dye composition which comprises (1) a reactive dye of the formula (I), and (2) at least one member selected from the group consisting of reactive dyes of the formulas (II) to (IV), the formulas being represented each in the free acid form as follows:

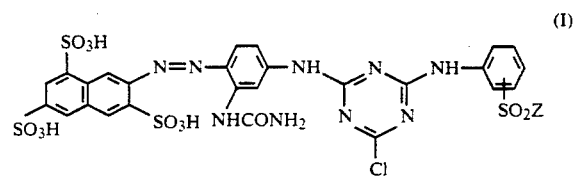

(I)

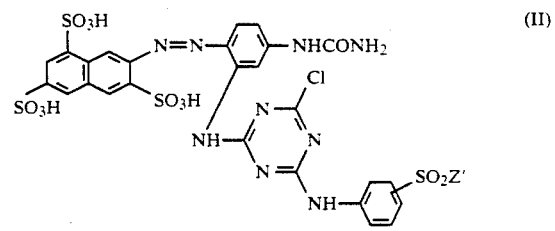

(II)

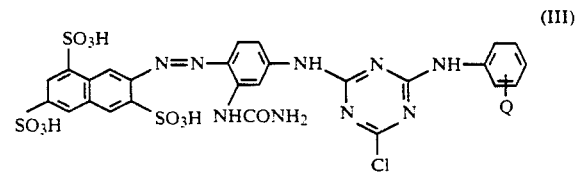

(III)

(Abstract continued on next page.)

-continued

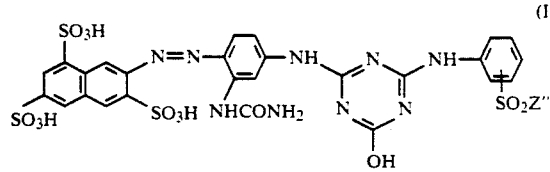

wherein Z, Z' and Z" are each —CH=CH$_2$ or —CH$_2$CH$_2$Z$_1$, —CH$_2$CH$_2$Z$_2$ or —CH$_2$CH$_2$Z$_3$, respectively, wherein Z$_1$, Z$_2$ and Z$_3$ are each a group capable of being split by the action of an alkali, and Q is —SO$_2$CH=CH$_2$ located at o-, m- or p-position against the imino when the —SO$_2$Z in the formula (I) is located at o-, m- or p-position against the imino, respectively, provided that the reactive dye of the formula (I) is one having —CH$_2$CH$_2$Z$_1$ as Z when the fiber reactive dye composition comprises the reactive dye of the formula (III), exhibits superior dye performance such as build-up property, solubility and durable stability, and is useful for dyeing or printing fiber materials or leather in a yellow color excellent in various fastness properties.

10 Claims, No Drawings

FIBER REACTIVE YELLOW DYE COMPOSITION

The present invention relates to a fiber reactive yellow dye composition useful for dyeing or printing hydroxyl- or amide-group containing materials, particularly those such as cellulose fibers, natural or synthetic polyamide fibers, polyurethane fibers, leathers or their mixed fibers, to obtain dyed or printed products superior in fastness properties such as light fastness and wet fastness.

Many fiber reactive dyes useful for dyeing or printing such materials in a yellow color are known. Among those, monoazo dyes having a vinylsulfone type fiber reactive group such as β-sulfatoethylsulfonyl group, which is attached to a monoazo chromophore through a substituted triazinyl bridging group, particularly those disclosed in Japanese Patent Kokai (Laid-open) No. 56-15481, have been extensively used for dyeing or printing such fiber materials, because of their excellent dye characteristics.

However, these prior art yellow dyes are not yet sufficient to meet recent needs of high level with respect to applicability of the dye to a specific dyeing method, dyeability to the fibers and fastness properties of the dyed or printed products.

The above-mentioned monoazo dyes are also waiting for improvement in dye performances such as build-up property, solubility, durable stability and fastness properties.

The present inventors have undertaken extensive studies to find a fiber reactive yellow dye meeting the needs described above and satisfying other requirements that become in high demand, and as a result attained to the present invention.

The present invention provides a fiber reactive dye composition which comprises (1) a reactive dye represented by the following formula (I) in the free acid form,

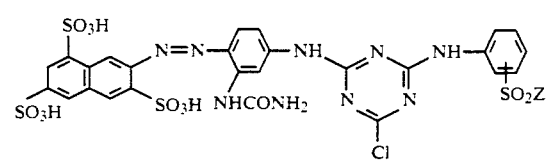

wherein Z is —CH=CH$_2$ or —CH$_2$CH$_2$Z$_1$ in which Z$_1$ is a group Capable of being split by the action of an alkali, and (2) at least one member selected from the group consisting of reactive dyes represented by the following formulas (II), (III) and (IV) each in the free acid form, the formula (II) being

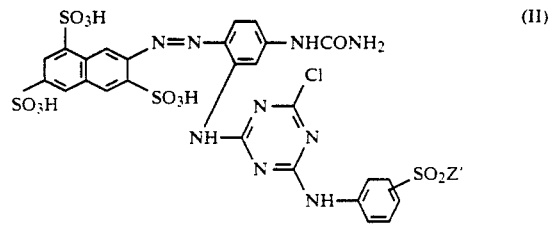

wherein Z' is —CH=CH$_2$ or —CH$_2$CH$_2$Z$_2$ in which Z$_2$ is a group capable of being split by the action of an alkali, the formula (III) being

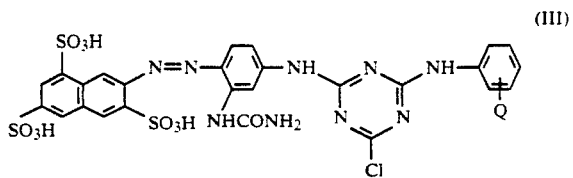

wherein Q is —SO$_2$CH=CH$_2$ located at o-, m- or p-position against the imino group when the —SO$_2$Z in the formula (I) is located at o-, m- or p-position against the imino group, respectively, and the formula (IV) being

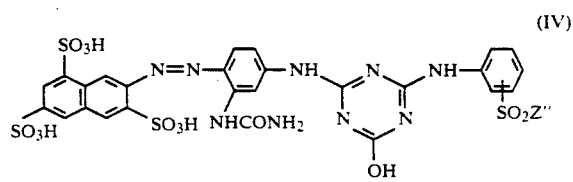

wherein Z" is —CH=CH$_2$ or —CH$_2$Ch$_2$Z$_3$ in which Z$_3$ is a group capable of being split by the action of an alkali, provided that the reactive dye of the formula (I) is one having —CH$_2$CH$_2$Z$_1$ as Z when the fiber reactive dye composition comprises the reactive dye of the formula (III), and a weight ratio of at least one reactive dye of the formula (II) to (IV) to the reactive dye of the formula (I) is from 1:100 to 50:100.

The present invention also provides a method for dyeing or printing fiber materials or leather, which comprises using the fiber reactive dye composition defined above.

The reactive dyes of the formulas (I) to (IV) in the present fiber reactive dye composition are in the form of free acid, or preferably in the form of salt, such as alkali metal and alkaline earth metal salts. Of these, particularly preferable are sodium salt, potassium salt and lithium salt.

The reactive dyes of the formulas (I) and (III) can be readily prepared, for example, by a method described in Japanese Patent Kokai (Laid open) Nos. 56-15481 and 57-143360.

The reactive dye of the formula (II) can be prepared in a manner described below.

In an aqueous medium, 2-aminonaphthalene -3,6,8-trisulfonic acid is diazotized in a conventional manner, followed by coupling with 1,3-diaminobenzene also in a conventional manner to obtain a monoazo compound. The monoazo compound is subjected to carbamidation (ureido formation) using a cyanate such as metal cyanates including sodium cyanate, thereby obtaining a ureido-carrying monoazo compound of the following formula,

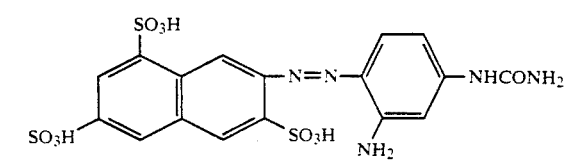

The ureido-carrying monoazo compound, cyanuric chloride and an aniline compound of the formula,

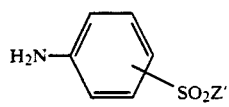

wherein Z' is as defined above, are subjected to condensation reactions in an optional order, thereby obtaining the reactive dye of the formula (II).

The carbamidation to convert the amino to ureido can be carried out preferably at a temperature of 0° to 70° C., more preferably 10° to 40° C., while controlling the pH within a range of preferably 4 to 10, more preferably 6 to 8. In carrying out the condensation reactions, a first condensation can be carried out in an aqueous medium preferably at a temperature of −10° to 50° C., more preferably 0° to 30° C., while controlling the pH within a range of preferably 1 to 10, more preferably 2 to 7, and a second condensation also in an aqueous medium preferably at a temperature of 0° to 70° C., more preferably 10° to 50° C., while controlling the pH within a range of preferably 2 to 9, more preferably 3 to 6.

The reactive dye of the formula (IV) is novel, and can be readily prepared, for example, by hydrolyzing the reactive dye of the formula (I) in an aqueous medium in a manner, for example, such that an aqueous solution of the reactive dye of the formula (I) is treated at a temperature of 50° to 100° C., preferably 60° to 80° C., within a pH ranging from 1 to 4, preferably from 2 to 3.

In the present invention, the vinylsulfone type fiber reactive group represented by —$SO_2Z$, —$SO_2Z'$, Q or —$SO_2Z''$ in the formulas (I), (II), (III) or (IV), respectively, is located preferably at m- or p-position against the imino group. The group capable of being split by the action of an alkali is well known in the art of the vinylsulfone type reactive dyes, and includes, for example, halogen such as chlorine, acetic acid ester group, phosphoric acid ester, thiosulfuric acid ester and sulfuric acid ester. Of these, particularly preferred is sulfuric acid ester group.

In the preparation of the present fiber reactive dye composition, the mixing weight ratio of at least one reactive dye of the formulas (II) to (IV) to the reactive dye of the formula (I) is from 1:100 to 50:100, preferably from 1:100 to 20:100. More specifically, the weight ratio of respective reactive dye of the formulas (II), (III) and (IV) is preferably 1 to 30, more preferably 2 to 15, preferably 1 to 50, more preferably 1 to 20, and preferably 1 to 50, more preferably 1 to 20, respectively.

The mixing of the reactive dye of the formula (I) with at least one member selected from the reactive dyes of the formula (II) to (IV) can be readily achieved in a manner such that respective reactive dyes are produced independently and then mixed with each other or one another, or produced simultaneously to obtain a desired mixture by controlling the reaction conditions in the preparation method of respective reactive dyes. Alternatively, respective reactive dyes may be mixed with each other or one another in the process of dyeing or printing.

The fiber reactive dye composition of the present invention may be in the form of powder, granule, grain or aqueous liquid and contain conventional dye auxiliary agents such as solubilizing agents, surfactants, buffers, dispersing agents and the like.

The fiber reactive dye composition is useful for dyeing or printing hydroxyl or amide group-containing materials in a conventional manner.

The hydroxyl group-containing materials include natural and synthetic ones such as cellulose fibers, regenerated products thereof and polyvinyl alcohol. Examples of the cellulose fibers are cotton and other vegetable fibers such as linen, hemp, jute and ramie fibers Examples of the regenerated cellulose fibers are viscose staple and filament viscose.

The amide-group containing materials include natural or synthetic polyamide and polyurethane. Examples thereof are wool and other animal furs, silk, leather, polyamide-6,6, polyamide-6, polyamide-11 and polyamide-4.

The fiber reactive dye composition of the present invention can be applied for dyeing or printing the above-said materials by a known method suitable for the physical and chemical properties of the materials, such as, for example, exhaustion dyeing, padding and printing.

The exhaustion dyeing can be carried out at a relatively low temperature in the presence of an acid binding agent such as sodium carbonate, trisodium phosphate, sodium hydroxide and the like, if desired, using a neutral salt such as sodium sulfate, sodium chloride and te like together with or without a hydrotropic agent, a penetrant, a level dyeing agent or the like. The neutral salt usable for promoting the exhaustion of the dye can be added collectively or dividedly to a dye bath after or before the bath temperature reaching to a desired level.

The padding can be carried out by padding the fiber materials at ambient temperature or elevated temperature. drying them and steaming or dry-heating them to perform the dye fixation.

The printing can be carried out in a one- or two-phase manner. The one-phase printing can be conducted by printing the fiber materials with a printing paste containing an acid binding agent such as sodium hydrogencarbonate and the like, followed by steaming at a temperature of 100° to 160° C. The two-phase printing can be conducted by printing the fiber materials with a neutral or weak acid printing paste, and passing the materials through a hot alkaline bath containing an electrolyte or over-padding the materials with an alkaline padding liquor containing an electrolyte, followed by a steaming or dry-heating treatment.

For the preparation of the printing paste, a stock paste or emulsifier such as sodium alginate, starch ether and the like can be used, if desired, together with a conventional auxiliary agent such as urea, dispersing agent and the like.

The acid binding agent used for fixing the reactive dye on the cellulose fiber is a water-soluble base salt consisting of alkali or alkaline earth metal and inorganic or organic acid and a compound capable of liberating alkali under heating conditions. Examples thereof are alkali metal hydroxides and alkali metal salts of weak or neutral inorganic or organic acid. Of these, particularly preferred are sodium and potassium salts. Examples of the acid binding agent are sodium hydroxide, potassium hydroxide, sodium hydrogen-carbonate, sodium carbonate, sodium formate, potassium carbonate, primary, secondary or tertiary sodium phosphate, sodium silicate, sodium trichloroacetate and the like.

The dyeing of natural or synthetic polyamide and polyurethane fiber materials can be carried out by effecting exhaustion in an acid or weak acid dye bath, while controlling the pH, and then making the bath neutral, or in some cases alkaline to effect the fixation. The dyeing temperature ranges usually from 60° to 120° C. In order to achieve a level dyeing, there may be used a conventional level dyeing agent such as a condensation product between cyanuric chloride and three times by mole of aminobenzenesulfonic acid or aminonaphthalenesulfonic acid, or an addition product between stearylamine and ethylen oxide.

The fiber reactive dye composition of the present invention is characterized by exhibiting superior dye performance when used for dyeing or printing the fiber materials, particularly cellulose fiber materials. For example, the dye composition can give dyed o printed products of a yellow color excellent in fastness properties such as light fastness, perspiration-light fastness, wet fastness including, for example, washing fastness, peroxide-washing fastness, perspiration fastness, chlorine fastness, acid-hydrolysis fastness, alkali fastness and the like, abrasion fastness and ironing fastness. Moreover, the dyed or printed products are hardly subject to change in their color even by a fixing treatment or resin finishing.

Further, the fiber reactive dye composition of the present invention is characterized by exhibiting superiority in build-up property, solubility, particularly solubility in an alkaline bath, level-dyeing property, washing-off property and exhaustion and fixation properties. Moreover, the dye composition is robust so that a color shade to be obtained can hardly be affected by changes in dye bath conditions such as dyeing temperatures and bath ratios, and therefore dyed or printed products with a constant quality can be obtained with superior reproducibility, and is superior in storage stability so that little deterioration occurs even in contact with base substances.

The present invention is illustrated in more detail with reference to the following Examples, which are only illustrative, but not limitative for the scope of the present invention. In Examples, parts are by weight, and formulas of reactive dyes used are expressed all in the free acid form.

EXAMPLE 1

100 Parts of a reactive dye represented by the following formula (a) in the free acid form,

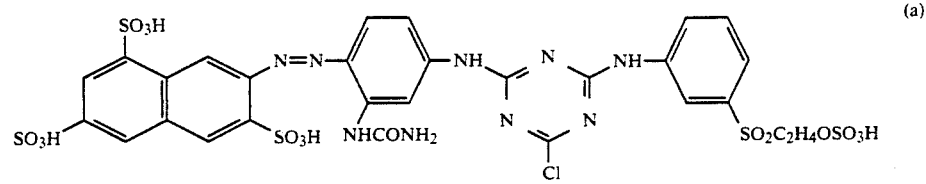

and 10 parts of a reactive dye represented by the following formula (b) in the free acid form,

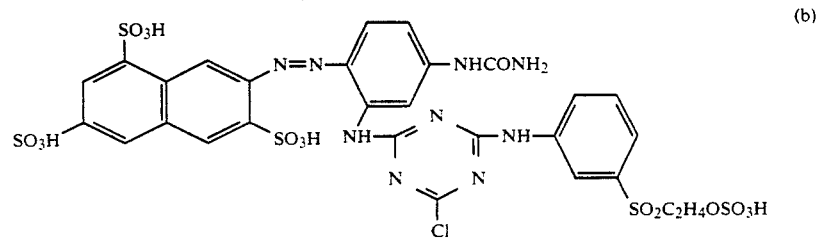

were mixed with each other to obtain a reactive dye composition.

The composition (0.1, 0.3 and 0.6 part) was dissolved in water (200 parts). Sodium sulfate (10 parts) and cotton (10 parts) were added thereto. The bath was heated to 60° C. and then sodium carbonate (4 parts) was added thereto. Dyeing was continued for 1 hour. Cotton taken out was washed with water, soaped and washed again with water to obtain a dyed product of a yellow color excellent in various fastness properties.

The reactive dye of the formula (b) was produced in the following manner.

2-Aminonaphthalene-3,6,8-trisulfonic acid (38.3 parts) was diazotized in water in a conventional manner, followed by coupling with 1,3-diaminobenzene (10.8 parts) also in a conventional manner. Sodium cyanate (7.15 parts) was added thereto, and the mixture was stirred at ambient temperature, while controlling the pH to 7 using 2N hydrochloric acid, thereby performing carbamidation. Successively, cyanuric chloride (18.5 parts) was added thereto to effect a first condensation, and then 1-amino-3-8-sulfatoethylsulfonyl-benzene (28.1 parts) was added to effect a second condensation. Thereafter, the reaction mixture was treated in a usual manner to isolate the reactive dye of the formula (b).

EXAMPLE 2

100 Parts of the reactive dye of the formula (a) and 5 parts of the reactive dye of the formula (b) were mixed with each other to obtain a reactive dye composition.

Using the dye composition (0.1, 0.3 and 0.6 parts), the dyeing procedure described in Example 1 was repeated to obtain a dyed product of a yellow color excellent in various fastness properties.

EXAMPLE 3

100 Parts of a reactive dye represented by the following formula (c) in the free acid form,

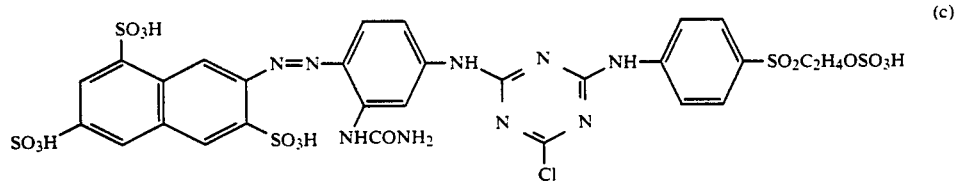

and 10 parts of a reactive dye represented by the following formula (d) in the free acid form,

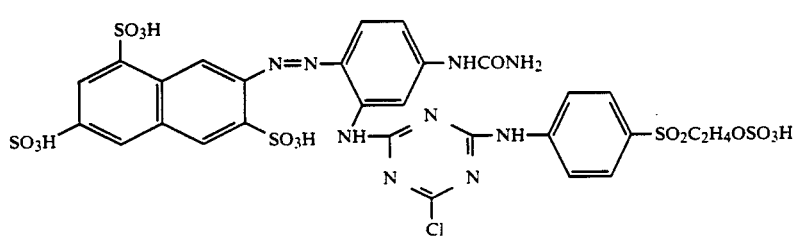

were mixed with each other to obtain a reactive dye composition.

Using the dye composition (0.1, 0.3 and 0.6 part), the dyeing procedure described in Example 1 was repeated to obtain a dyed product excellent in various fastness properties.

EXAMPLE 4

100 Parts of a reactive dye represented by the following formula (e) in the free acid form,

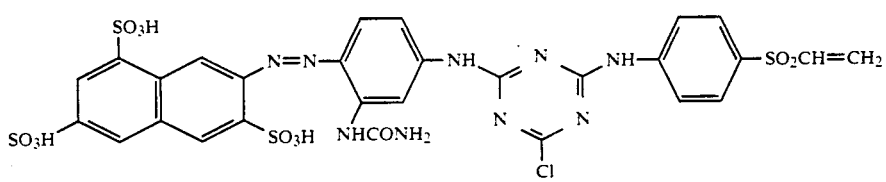

and 5 parts of a reactive dye represented by the following formula (f) in the free acid form,

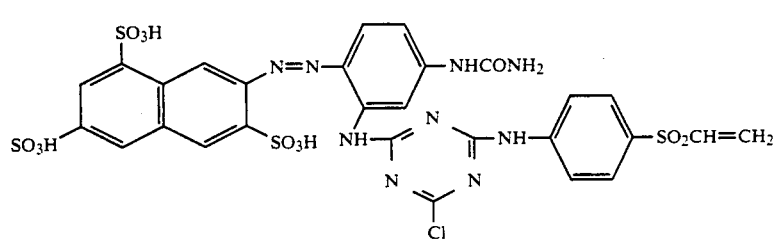

were mixed with each other to obtain a reactive dye composition.

Using the dye composition (0.1, 0.3 and 0.6 part), the dyeing procedure described in Example 1 was repeated to obtain a dyed product of a yellow color excellent in various fastness properties.

EXAMPLE 5

Using the reactive dye compositions obtained in Examples 1 to 4, respective color pastes having the following composition were prepared.

| | |
|---|---|
| Reactive dye composition | 5 parts |
| Urea | 5 parts |
| Sodium alginate (5% by weight) stock paste | 50 parts |
| Hot water | 25 parts |
| Sodium hydrogen carbonate | 2 parts |
| Balance (water) | 13 parts |

Mercerized broad cotton cloth was printed with the color paste, and then pre-dried, steamed at 100° C. for 5 minutes, washed with hot water, soaped, washed again with hot water and dried to obtain a printed product of a yellow color excellent in various fastness properties.

EXAMPLE 6

100 Parts of the reactive dye of the formula (a) and 10 parts of a reactive dye represented by the following formula (g) in the free acid form,

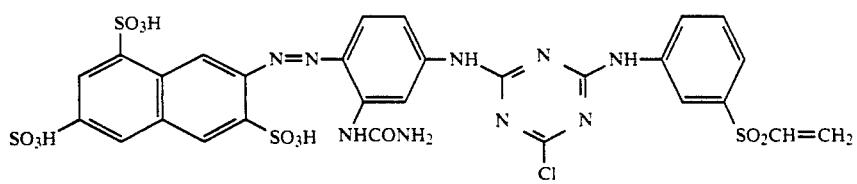

were mixed with each other to obtain a reactive dye composition.

Using the dye composition (0.1, 0.3 and 0.6 part), the dyeing procedure described in Example 1 was repeated to obtain a dyed product excellent in various fastness properties. The build-up property of the dye composition was found to be superior.

The reactive dye of the formula (g) had been prepared by treating the reactive dye of the formula (a) in an aqueous medium at a temperature of 30° to 50° C. and at a pH of 8 to 9.

EXAMPLE 7

100 Parts of the reactive dye of the formula (a) and 20 parts of the reactive dye of the formula (g) were mixed with each other to obtain a reactive dye composition.

Using the dye composition obtained (0.1, 0.3 and 0.6 part), the dyeing procedure described in Example 1 was repeated to obtain a dyed product of a yellow color excellent in various fastness properties, and the build-up property of the dye composition was found to be superior.

EXAMPLE 8

Example 6 was repeated, provided that the reactive dye of the formula (g) was used in an amount of 5 parts, and then similar dyeing results were obtained.

EXAMPLE 9

100 Parts of the reactive dye of the formula (c) and 10 parts of the reactive dye of the formula (e) were mixed with each other to obtain a reactive dye composition.

Using the dye composition (0.1, 0.3 and 0.6 part), the dye procedure described in Example 1 was repeated to obtain a dyed product of a yellow color excellent in various fastness properties, and the build-up property of the composition was found to be superior.

EXAMPLE 10

Example 9 was repeated, provided that the reactive dye of the formula (e) was used in an amount of 20 parts, and then similar dyeing results were obtained.

EXAMPLE 11

A color paste was prepared, and then printing was carried out using it both in manners similar to those described in Example 5, provided that the reactive dye composition obtained in Example 6 was used, thereby obtaining a printed product excellent in various fastness properties with superior build-up property.

EXAMPLE 12

100 Parts of the reactive dye of the formula (a) and 10 parts of a reactive dye represented by the following formula (h) in the free acid form,

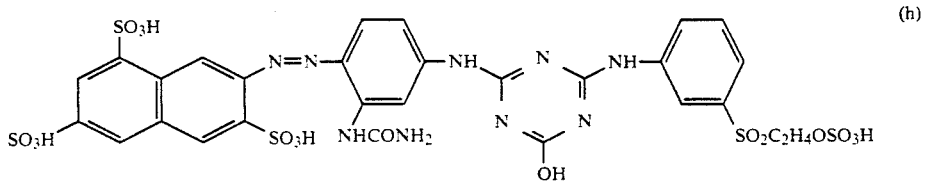

were mixed with each other to obtain a reactive dye composition.

Using the dye composition (0.1, 0.3 and 0.6 part), the dyeing procedure described in Example 1 was repeated to obtain a dyed product of a yellow color excellent in various fastness properties.

The reactive dye of the formula (h) was prepared by treating the reactive dye of the formula (a) in an aqueous medium at a temperature of 60° to 80° C. and at a pH of 1 to 3.

EXAMPLE 13

Example 12 was repeated, provided that the reactive dye of the formula (h) was used in an amount of 15 parts to obtain a reactive dye composition. The dyeing results were found to be similar to those of Example 12.

EXAMPLE 14

Example 12 was repeated, provided that the reactive dye of the formula (h) was used in an amount of 3 parts. The dyeing results were found to be similar to those of Example 12.

EXAMPLE 15

100 Parts of the reactive dye of the formula (c) and 5 parts of a reactive dye of the following formula (i) in the free acid form,

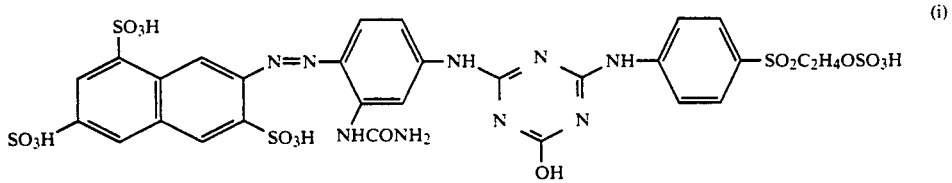

were mixed with each other to obtain a reactive dye composition.

Using the dye composition obtained (0.1, 0.3 and 0.6 part), the dyeing procedure described in Example 1 was repeated to obtain a dyed product of a yellow color excellent in various fastness properties.

EXAMPLE 16

100 Parts of the reactive dye of the formula (c) and 10 parts of a reactive dye represented by the following formula (j) in the free acid form,

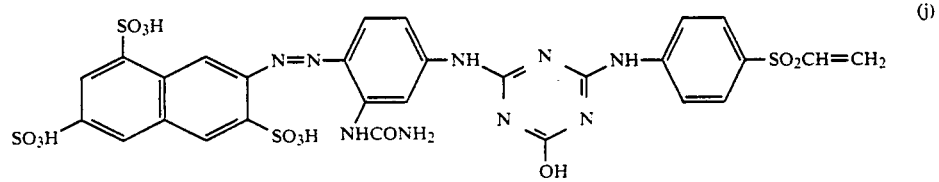

were mixed with each other to obtain a reactive dye composition.

Using the dye composition (0.1, 0.3 and 0.6 part), the dyeing procedure described in Example 1 was repeated to obtain a dyed product of a yellow color excellent in various fastness properties.

EXAMPLE 17

A color paste was prepared, and printing was carried out both in manners similar to those described in Example 5, provided that the reactive dye composition obtained in Example 12 was used. A printed product excellent in various fastness properties was obtained with superior build-up property.

EXAMPLE 18

100 Parts of the reactive dye of the formula (a), 5 parts of the reactive dye of the formula (h) and 10 parts of the reactive dye of the formula (g) were mixed with one another to obtain are active dye composition.

Using the dye composition obtained (0.1, 0.3 and 0.6 part), the dyeing procedure described in Example 1 was repeated to obtain a dyed product of a yellow color excellent in various fastness properties. The build-up property of the dye composition was found to be superior.

EXAMPLE 19

Example 18 was repeated, provided that the reactive dyes of the formulas (h) and (g) were used in amounts of 3 parts and 20 parts, respectively. The dyeing results using the dye composition obtained were found to be similar to those of Example 18.

EXAMPLE 20

100 Parts of the reactive dye of the formula (a), 10 parts of the reactive dye of the formula (h) and 4 parts of the reactive dye of the formula (b) were mixed with one another to obtain a reactive dye composition.

EXAMPLE 21

100 Parts of the reactive dye of the formula (a), 15 parts of the reactive dye of the formula (g) and 5 parts of the reactive dye of the formula (b) were mixed with one another to obtain a reactive dye composition.

Using the obtained dye composition (0.1, 0.3 and 0.6 part), the dyeing procedure described in Example 1 was repeated to obtain a dyed product of a yellow color excellent in various fastness properties. The build-up property of the dye composition was found to be superior.

EXAMPLE 22

100 Parts of the reactive dye of the formula (c), 1 part of the reactive dye of the formula (i), and 5 parts of the reactive dye of the formula (e) were mixed with one another to obtain a reactive dye composition.

Using the obtained dye composition (0.1, 0.3 and 0.6 part), the dyeing procedure described in Example 1 was repeated to obtain a dyed product of a yellow color excellent in various fastness properties. The build-up property of the dye composition was found to be superior.

EXAMPLE 23

100 Parts of the reactive dye of the formula (c), 15 parts of the reactive dye of the formula (e) and 3 parts of the reactive dye of the formula (d) were mixed with one another to obtain a reactive dye composition.

EXAMPLE 24

100 Parts of the reactive dye of the formula (e), 5 parts of the reactive dye of the formula (j) and 3 parts of the reactive dye of the formula (f) were mixed with one another to obtain a reactive dye composition.

EXAMPLE 25

The reactive dyes of the formulas (a), (h), (g) and (b) in amounts of 100, 5, 10 and 4 parts, respectively, were mixed with one another to obtain a reactive dye composition.

EXAMPLE 26

The reactive dyes of the formulas (c), (i), (e) and (d) in amounts of 100, 4, 15 and 4 parts, respectively, were mixed with one another to obtain a reactive dye composition.

EXAMPLE 27

Using the reactive dye compositions obtained in Examples 23, 24, 25 and 26 (0.1, 0.3 and 0.6 part, independently of one another), the dyeing procedure described in Example 1 was repeated to obtain respective dyed products of a yellow color excellent in various fastness properties. The build-up property of respective dye compositions was found to be superior.

EXAMPLE 28

Using the reactive dye compositions obtained in Examples 18 to 26, respective color pastes were prepared, and printing was carried out respectively both in the same manners as those of Example 5. Respective printed products excellent in various fastness properties were obtained with superior build-up property.

We claim:

1. A fiber reactive dye composition which comprises (1) a reactive dye represented by the following formula (I) in the free acid form,

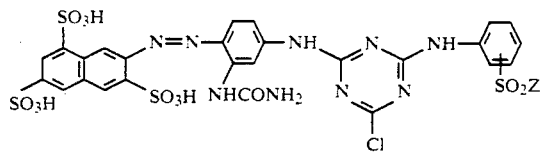

wherein Z is —CH=CH$_2$ or —CH$_2$CH$_2$Z$_1$ in which Z$_1$ is a group capable of being split by the action of an alkali, and (2) at least one member selected from the group consisting of reactive dyes represented by the following formulas (II), (III) and (IV) in the free acid form, the formula (II) being

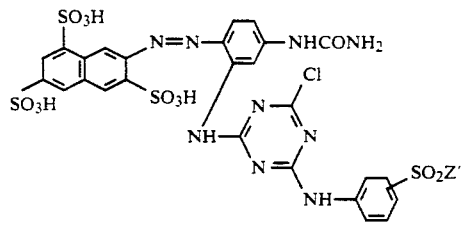

wherein Z' is —CH=CH$_2$ or —CH$_2$CH$_2$Z$_2$ in which Z$_2$ is a group capable of being split by the action of an alkali, the formula (III) being

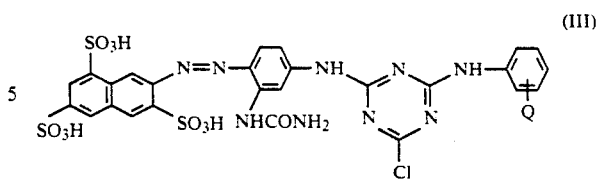

wherein Q is —SO$_2$CH=CH$_2$ located at o-, m- or p-position against the imino group where Q in the formula (III) is located at the same position relative to imino as is the SO$_2$Z in the formula (I), and the formula (IV) being

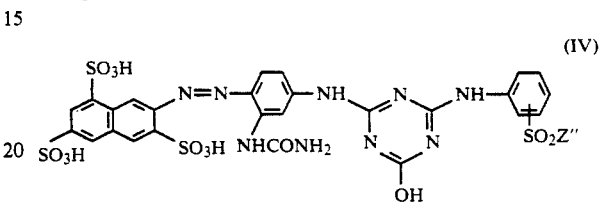

wherein Z" is —CH=CH$_2$ or —CH$_2$CH$_2$Z$_3$ in which Z$_3$ is a group capable of being split by the action of an alkali, provided that the reactive dye of the formula (I) is one having —CH$_2$CH$_2$Z$_1$ as Z when the fiber reactive dye composition comprises the reactive dye of the formula (III), and a weight ratio of at least one reactive dye of the formulas (II) to (IV) to the reactive dye of the formula (I) is from 1:100 to 50:100.

2. The composition according to claim 1, wherein the composition comprises the reactive dye of the formula (I) and the reactive dye of the formula (II) in a weight ratio of 100:1-30.

3. The composition according to claim 1, wherein the composition comprises the reactive dye of the formula (I) having —CH$_2$CH$_2$Z$_1$ as Z and the reactive dye of the formula (III) in a weight ratio of 100:1-50.

4. The composition according to claim 1, wherein the composition comprises the reactive dye of the formula (I) and the reactive dye of the formula (IV) in a weight ratio of 100:1 to 50.

5. The composition according to claim 1, wherein the composition comprises the reactive dye of the formula (I) and at least two members selected from the group consisting of reactive dyes represented by the formulas (II) to (IV), provided that the reactive dye of the formula (I) is one having —CH$_2$CH$_2$Z$_1$ as Z when the fiber reactive dye composition comprises the reactive dye of the formula (III).

6. The composition according to claim 1, wherein the reactive dye of the formula (I) is one having —SO$_2$Z located at m- or p-position against the imino group.

7. The composition according to claim 1, wherein the reactive dye of the formula (II) is one having —SO$_2$Z' located at m- or p-position against the imino group.

8. The composition according to claim 1, wherein the reactive dye of the formula (III) is one having -Q located at m- or p-position against the imino group.

9. The composition according to claim 1, wherein the reactive dye of the formula (IV) is one having —SO$_2$Z" located at m- or p-position against the imino group.

10. A method for dyeing or printing hydroxyl or amide group-containing materials or leather, which comprises using the fiber reactive dye composition of claim 1.

* * * * *